(12) United States Patent
Grivetti et al.

(10) Patent No.: US 10,543,617 B2
(45) Date of Patent: Jan. 28, 2020

(54) SYSTEM AND METHOD OF CONNECTING TWO 3D PRINTED STRUCTURES

(71) Applicant: Caterpillar Inc., Peoria, IL (US)

(72) Inventors: Tazio Grivetti, Chillicothe, IL (US); Andrew Meinert, Metamora, IL (US); Nathan Weaver, Fremont, CA (US)

(73) Assignee: Caterpillar Inc., Peoria, IL (US)

( * ) Notice: Subject to any disclaimer, the term of this patent is extended or adjusted under 35 U.S.C. 154(b) by 746 days.

(21) Appl. No.: 15/136,184

(22) Filed: Apr. 22, 2016

(65) Prior Publication Data
US 2017/0305034 A1 Oct. 26, 2017

(51) Int. Cl.
*B29C 64/00* (2017.01)
*B28B 1/00* (2006.01)
*B33Y 10/00* (2015.01)
*B33Y 30/00* (2015.01)
*B33Y 80/00* (2015.01)

(52) U.S. Cl.
CPC .............. *B28B 1/001* (2013.01); *B28B 1/002* (2013.01); *B33Y 10/00* (2014.12); *B33Y 30/00* (2014.12); *B33Y 80/00* (2014.12)

(58) Field of Classification Search
None
See application file for complete search history.

(56) References Cited

U.S. PATENT DOCUMENTS

2005/0280185 A1* 12/2005 Russell ................... B28B 1/001
264/308
2008/0052878 A1* 3/2008 Lewis ..................... F16B 5/065
24/297
2014/0086704 A1* 3/2014 Hemingway ......... B29C 64/141
411/392

FOREIGN PATENT DOCUMENTS

| CN | 104328845 A | 2/2015 |
| CN | 104453014 A | 3/2015 |
| CN | 204626701 U | 9/2015 |

* cited by examiner

*Primary Examiner* — Monica A Huson
*Assistant Examiner* — Kelsey C Grace
(74) *Attorney, Agent, or Firm* — Bookoff McAndrews

(57) ABSTRACT

A method for forming three-dimensional (3D) printed structures is disclosed. The method may include 3D printing a first structural member including an opening to a cavity inside the first structural member; and 3D printing a second structural member including a protrusion disposed within the opening and the cavity of the first structural member.

20 Claims, 11 Drawing Sheets

US 10,543,617 B2

SYSTEM AND METHOD OF CONNECTING TWO 3D PRINTED STRUCTURES

FIELD OF THE DISCLOSURE

The present disclosure relates generally to three-dimensional (3D) printing and, more particularly, to 3D printing construction techniques for structural buildings.

BACKGROUND OF THE DISCLOSURE

Three-dimensional (3D) printing, or additive manufacturing, may be used to make 3D objects based off of a 3D model or other electronic data source. To produce an object, a 3D printer lays down successive layers of a material under computer control. Recently, 3D printing has started to revolutionize the architecture and construction industry. More specifically, there has been exploration of using giant 3D printers to construct buildings for commercial and private habitation. Advantages of 3D printing buildings include, but are not limited to, faster construction times, lower labor costs, and decreased waste production.

For example, 3D printers may extrude quick-drying cement from a print head layer-by-layer according to a computer-aided design (CAD) model, or other reference model, used as a template. In 3D printers for constructing buildings, the print head may be operatively mounted on a mobile frame, such as a gantry, a crane, an excavator, and other construction machines. Various control systems may be used to control the movement of the 3D printers and the print head.

One illustration of 3D printing is disclosed in Chinese Patent No. 204626701, entitled, "Connection Structure of Framed Beam and Outer Infilled Wall of a 3D Printing Building." In the '701 patent, the connection structure has a frame beam connected with a building filling wall. The '701 building filling wall is set with a butt joint. The butt joint is connected with an isolating layer and an interior layer.

While arguably effective, there is still a need for a way to connect two 3D printed structural members together that are formed at different phases.

SUMMARY OF THE DISCLOSURE

In accordance with one embodiment, a method for forming three-dimensional (3D) printed structures is disclosed. The method may include 3D printing a first structural member including an opening to a cavity inside the first structural member; and 3D printing a second structural member including a protrusion disposed within the opening and the cavity of the first structural member.

In accordance with another embodiment, a system for forming 3D printed structures is disclosed. The system may include a frame and a print head operatively coupled to the frame. The print head may include a nozzle positioned at a side of the print head. The system may further include a controller in operative communication with the frame and the print head. The controller may be configured to operate the frame and the print head to 3D print a first concrete wall with an opening to a cavity inside the first concrete wall and 3D print a second concrete wall with a protrusion interlocking with the cavity of the first concrete wall.

In accordance with another embodiment, a 3D printed structure is disclosed. The 3D printed structure may include a first wall formed via concrete 3D printing, the first wall including a first cavity; a second wall formed via concrete 3D printing, the second wall including a second cavity positioned proximate the first cavity of the first wall; and a spline disposed in the first cavity of the first wall and the second cavity of the second wall, the spline connecting the first wall and the second wall.

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

Figure 1:
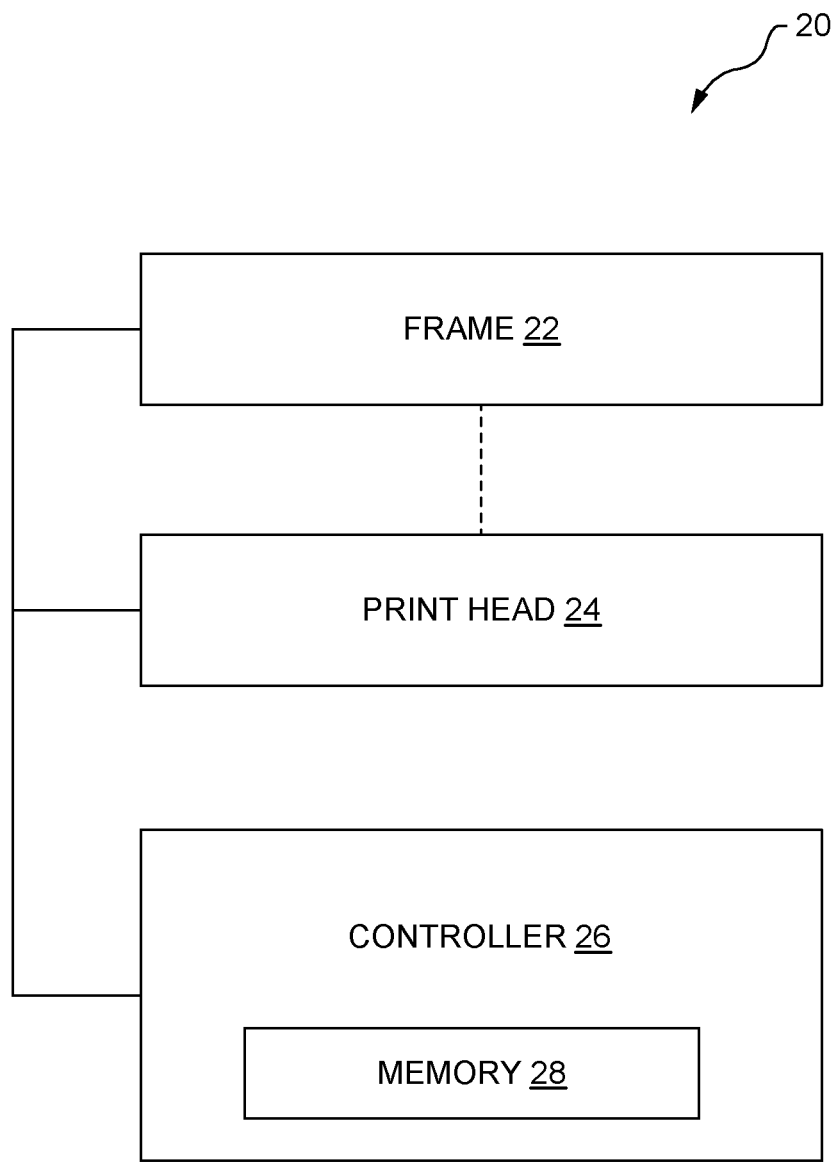
FIG. 1 is a schematic representation of a system for forming three-dimensional (3D) printed structures, in accordance with one embodiment of the present disclosure.
Figure 2:
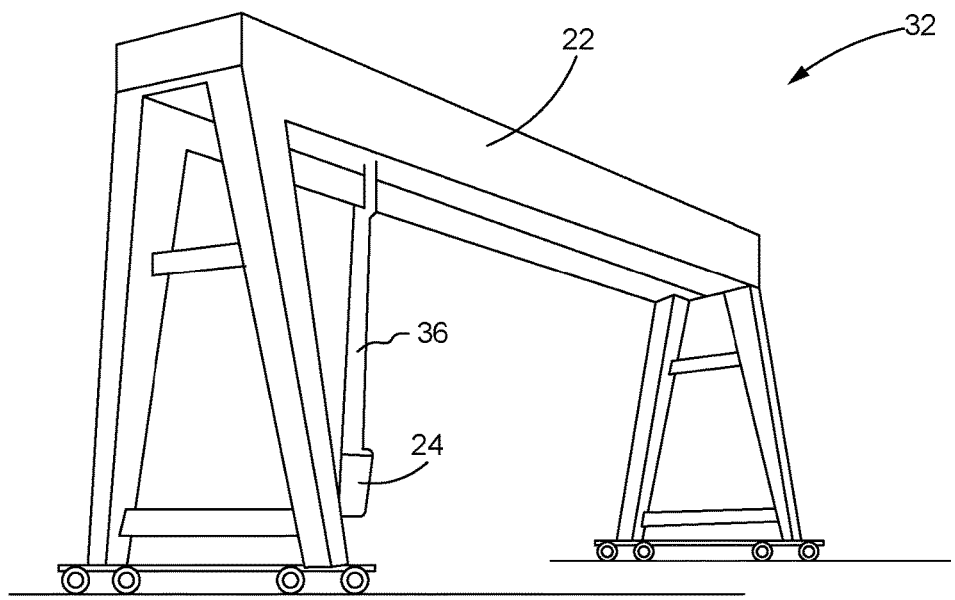
FIG. 2 is a perspective view of the system of FIG. 1 using a gantry, in accordance with another embodiment.
Figure 3:
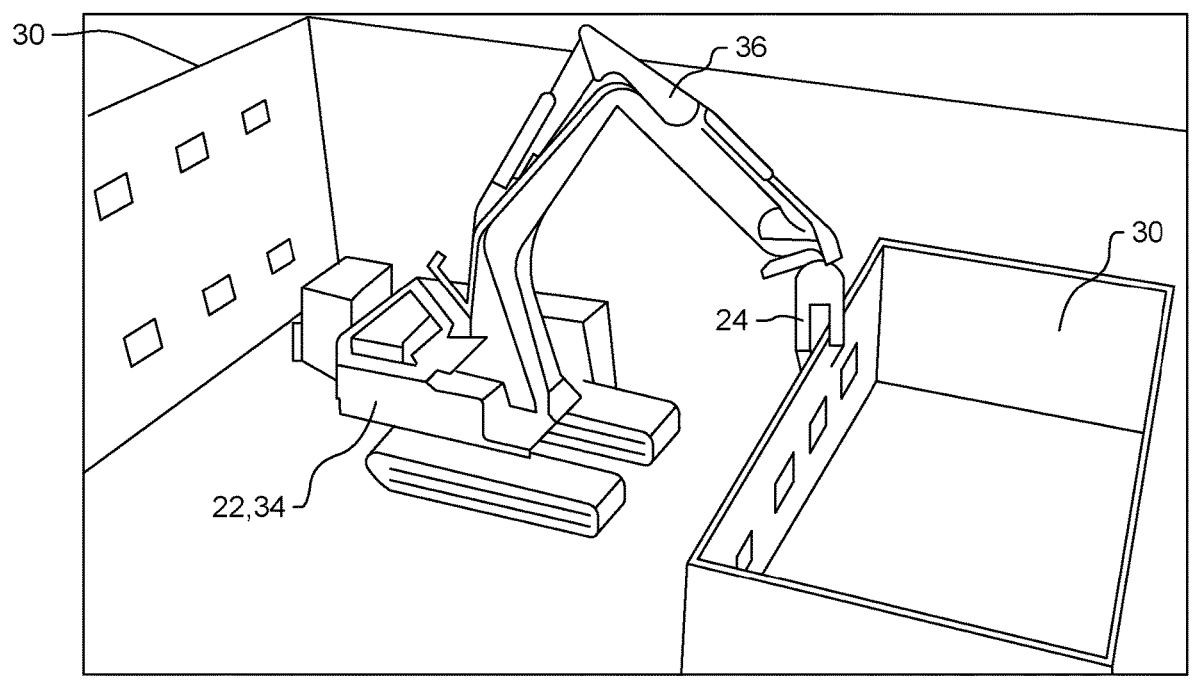
FIG. 3 is a perspective view of the system of FIG. 1 using a construction machine, in accordance with another embodiment.

Referring now to the drawings, and with specific reference to FIGS. 1-3, a system 20 for forming three-dimensional (3D) printed structures is shown, in accordance with certain embodiments of the present disclosure. The system 20 may include a frame 22, a print head 24 operatively coupled to the frame 22, and a controller 26 in operative communication with the frame 22 and the print head 24. More specifically, the system 20 may be a 3D printer used to print structures 30 (FIG. 3), such as buildings for commercial and private habitation. It is to be understood that the system 20 is shown primarily for illustrative purposes to assist disclosing features of various embodiments, and that FIGS. 1-3 do not depict all of the components of a 3D printer.

In the example of FIG. 2, the frame 22 may comprise a gantry 32, or other movable framework for supporting the print head 24. In the example of FIG. 3, the frame 22 may comprise a machine frame 34, such as of an excavator or other type of machine, and the print head 24 may be the implement of the machine. However, other types of configurations than that shown, in FIGS. 2 and 3, may be used for the system 20.

The print head 24 may be operatively mounted to an extruder arm 36, or other support structure, that is movably attached to the frame 22. Furthermore, the print head 24 may be configured to extrude a material to form the structures 30. Examples of materials may include, but not be limited to, cement based materials, such as concrete, as well as non-cement based materials.

The controller 26 may be in communication with actuators configured to move the frame 22 and the print head 24. More specifically, the controller 26 may be implemented using one or more of a processor, a microprocessor, a microcontroller, a digital signal processor (DSP), a field-programmable gate array (FPGA), an electronic control module (ECM), an electronic control unit (ECU), and a processor-based device that may include or be associated with a non-transitory computer readable storage medium having stored thereon computer-executable instructions, or any other suitable means for electronically controlling functionality of the system 20.

For example, the controller 26 may be configured to operate according to predetermined algorithms or sets of instructions for operating, positioning, and moving the frame 22 and the print head 24 to construct the structures 30 in successive layers. Such algorithms or sets of instructions may be programmed or incorporated into a memory 28 associated with or at least accessible to the controller 26. The memory 28 may comprise a non-volatile memory provided within and/or external to the controller 26. It is understood that the controller 26 and the system 20 may include other hardware, software, firmware, and combinations thereof.

Figure 4:
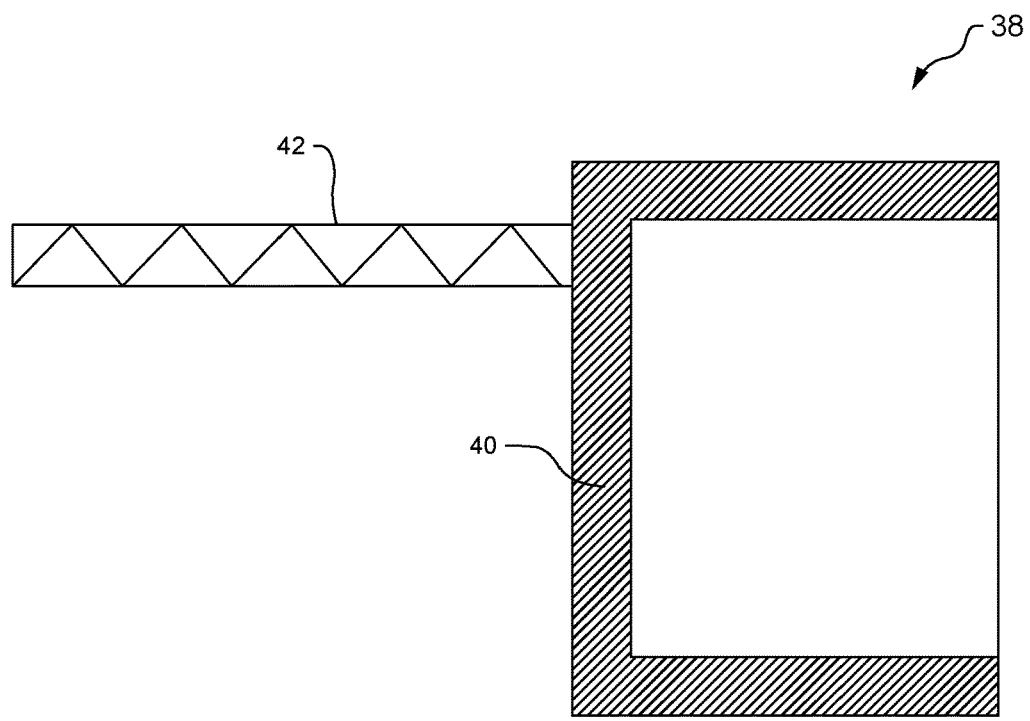
FIG. 4 is a cross-sectional view of a 3D printed structure formed from connecting a first structural member and a second structural member together, in accordance with another embodiment.

Referring now to FIG. 4, with continued reference to FIGS. 1-3, the system 20 may be configured to produce a connected 3D printed structure 38. For example, the system 20 may be configured to connect two 3D printed structural members 40, 42 together that are formed in sections or at different phases. More specifically, the controller 26 may be configured to 3D print a first structural member 40 in layer-wise iterations. After the first structural member 40 is completed, the controller 26 may be configured to subsequently 3D print, in layer-wise iterations, a second structural member 42 that is connected to the first structural member 40.

However, it is to be understood that the second structural member 42 may be 3D printed first before the first structural member 40 is 3D printed. Subsequently, the first structural member 40 may be 3D printed after the second structural member 42 is 3D printed. In addition, the first structural member 40 and the second structural member 42 may be 3D printed at a same time.

In an example, each of the first structural member 40 and the second structural member 42 may comprise a wall, such as for a building. However, the first structural member 40 and the second structural member 42 may comprise other structures as well. Furthermore, each of the first structural member 40 and the second structural member 42 may be designed to include features that enable connectivity.

Figure 5:
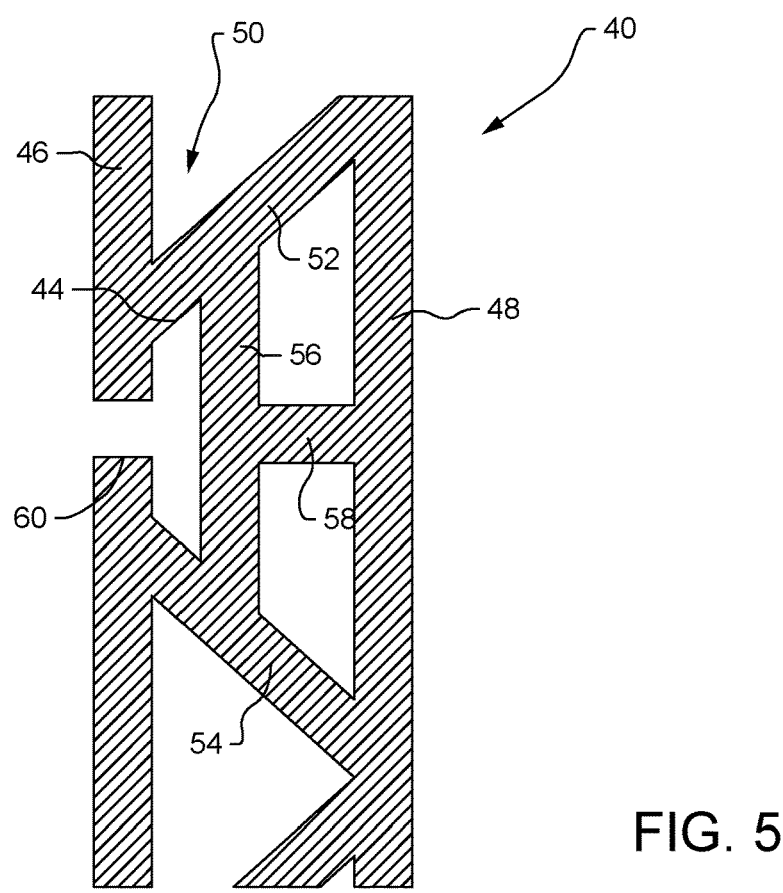
FIG. 5 is an enlarged cross-sectional view of the first structural member of FIG. 4, in accordance with another embodiment.

For example, as shown in FIG. 5, the first structural member 40 may include an interior cavity 44. The cavity 44 may comprise a defined space inside the first structural member 40 configured to interlock with the second structural member 42. More specifically, the first structural member 40 may include a first panel 46, a second panel 48 opposite the first panel 46, and infill 50 therebetween. The infill 50 may be diagonally disposed in a zigzag pattern between the first panel 46 and the second panel 48, although other configurations may be used.

The first panel 46, a first infill component 52, a second infill component 54, and a buttress 56 may define the cavity 44, such as a shape and a size of the cavity 44. Buttresses 56, 58 may be incorporated to the infill 50 of the first structural member 40 in order to form the cavity 44. Due to the diagonally oriented infill components 52, 54, a cross-section of the cavity 44 may be generally trapezoidal in shape. However, other shapes and configurations may be used for the cavity 44.

Furthermore, the first structural member 40 may include an opening 60 that leads into the cavity 44. For example, the opening 60 may be disposed in the first panel 46 of the first structural member 40 and may lead into a center of the cavity 44. A width $W_1$ of the opening 60 may be smaller than a length $L_1$ of the cavity 44. However, other configurations for the opening 60 may be used.

Figure 6:
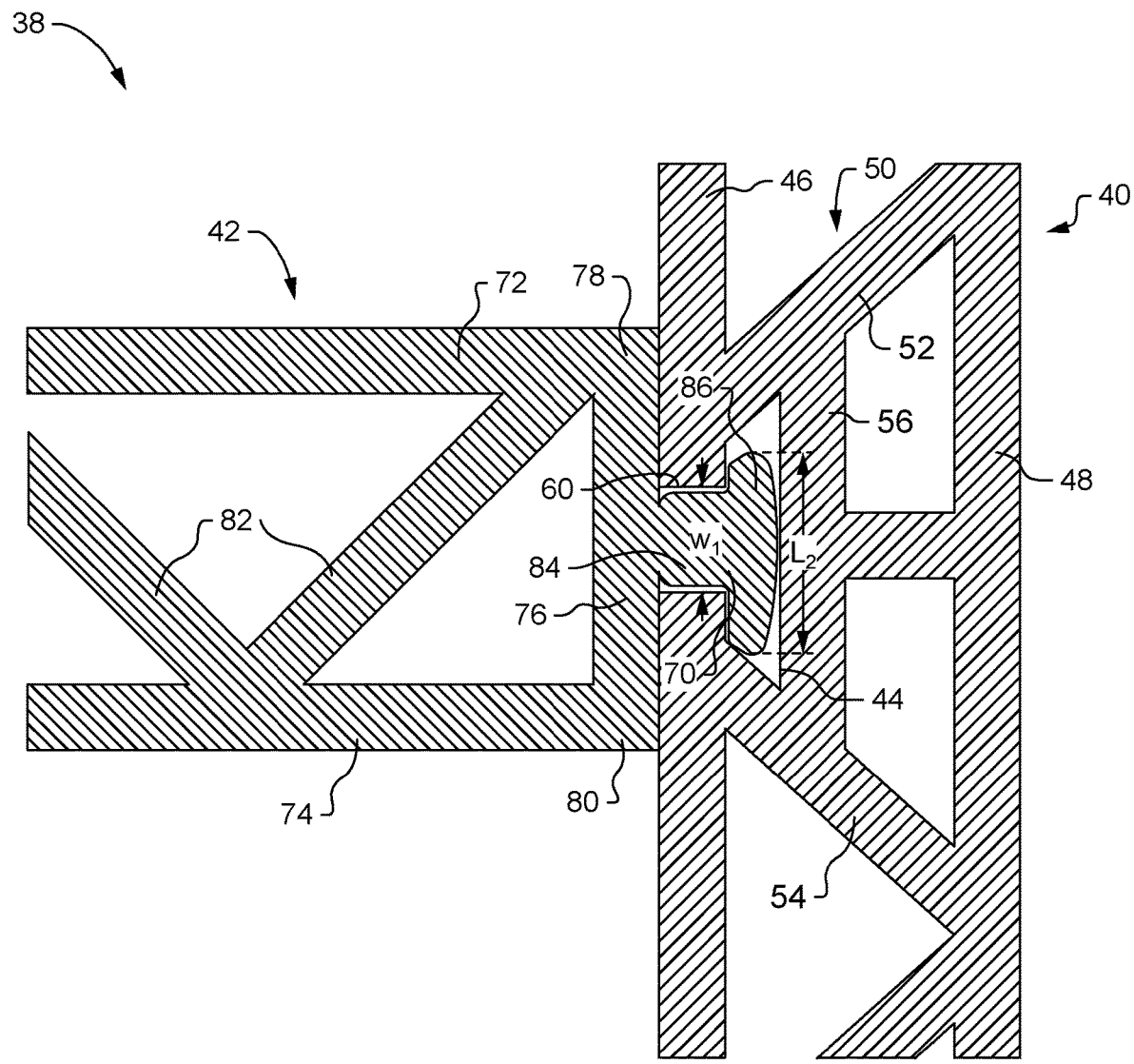
FIG. 6 is an enlarged cross-sectional view of a connection between the first structural member and the second structural member of FIG. 4, in accordance with another embodiment.

In order to connect the second structural member 42 to the first structural member 40, the second structural member 42 may include a protrusion 70 configured to interlock with the cavity 44, as shown in FIG. 6. More specifically, the second structural member 42 may include a first panel 72, a second panel 74 opposite the first panel 72, an end panel 76 disposed at ends 78, 80 of the first panel 72 and the second panel 74, respectively, and infill 82 therebetween. The infill 82 may be diagonally disposed in a zigzag pattern between the first panel 72 and the second panel 74, although other configurations may be used.

The end panel 76 may be positioned proximate the first structural member 40, such as adjacent to the first panel 46 of the first structural member 40. The protrusion 70 may extend from the end panel 76 of the second structural member 42 into the first structural member 40. More specifically, the protrusion 70 may be disposed within the opening 60 and the cavity 44 of the first structural member 40.

The protrusion 70 may include a neck 84 and an interlocking portion 86. The neck 84 of the protrusion 70 may be positioned within the opening 60, while the interlocking portion 86 may be positioned within the cavity 44. The interlocking portion 86 may have a dimension that is greater than the width $W_1$ of the opening 60 in the first structural member 40. In so doing, the interlocking portion 86 may be unable to pass through the opening 60 in the first panel 46 of the first structural member 40, thereby interlocking the protrusion 70 within the cavity 44 and connecting the first and second structural members 40, 42.

Figure 7:
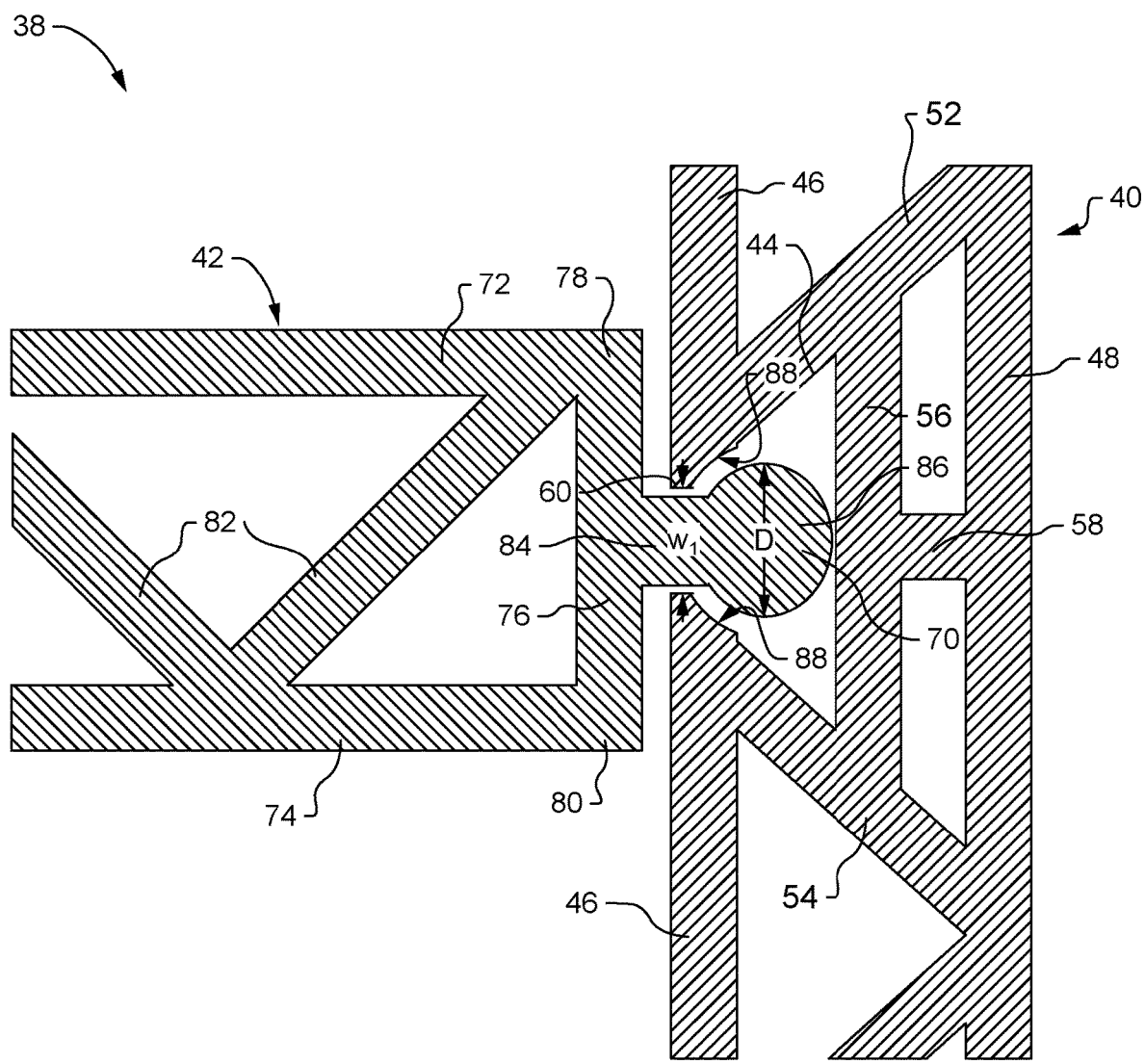
FIG. 7 is an enlarged cross-sectional view of a connection between the first structural member and the second structural member of FIG. 4, in accordance with another embodiment.

For example, as shown in FIG. 6, the protrusion 70 may have a substantially T-shaped cross-section with a length $L_2$ of the interlocking portion 86 being greater than the width $W_1$ of the opening 60. In the example shown in FIG. 7, the interlocking portion 86 of the protrusion 70 may have a circular cross-section with a diameter D being greater than the width $W_1$ of the opening 60. Furthermore, in the example of FIG. 7, the cavity 44 may include curved surfaces 88 in the first panel 46, the first infill component 52, and the second infill component 54 of the first structural member 40 in order to receive the circular cross-sectional shape of the protrusion 70. However, other shapes and configurations for the protrusion 70, the opening 60, and the cavity 44 may be used.

Figure 8:
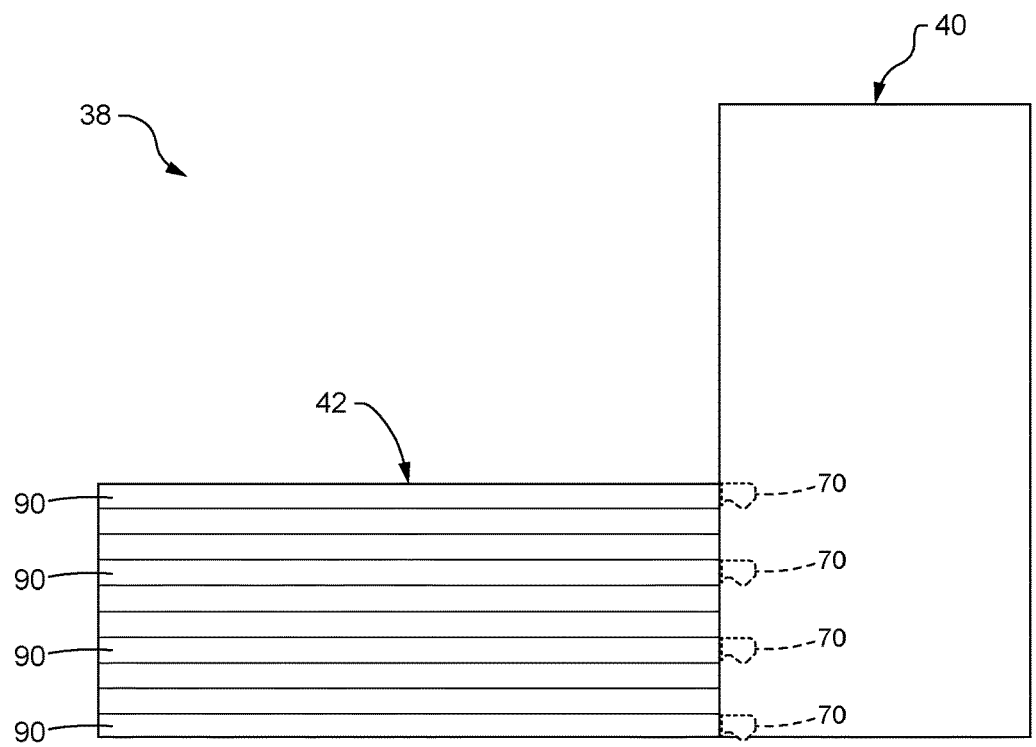
FIG. 8 is a side view of the 3D printed structure of FIG. 4, in accordance with another embodiment.

In an example, the protrusion 70 may be formed with every layer of the second structural member 42. In another example, the protrusion 70 may not be formed with every layer of the second structural member 42. For instance, a protrusion 70 may only be formed in every other layer, every third layer, every fourth layer, or in any other sequence. The example of FIG. 8 shows a protrusion 70 formed (in phantom) in every third layer 90 of the second structural member 42. However, other configurations for forming the protrusion(s) 70 of the second structural member 42 may be used.

Figure 9:
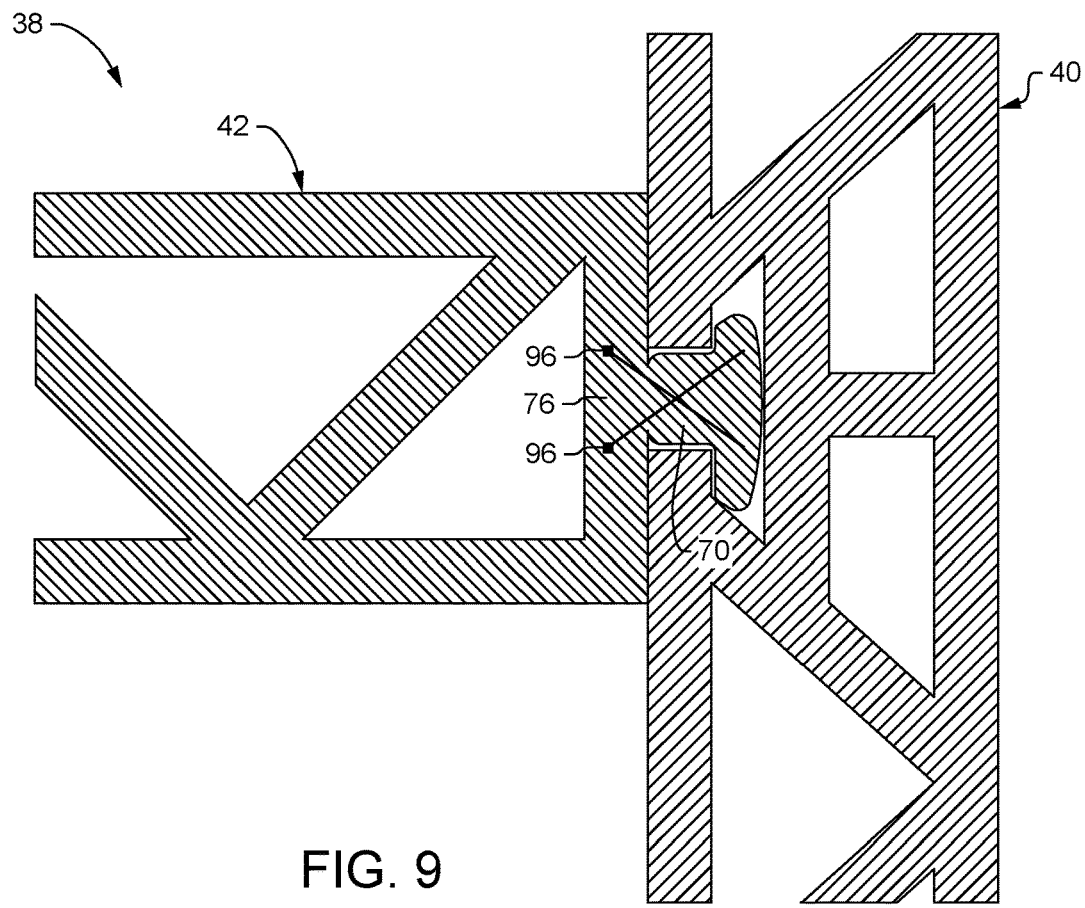
FIG. 9 is an enlarged cross-sectional view of a connection between the first structural member and the second structural member of FIG. 4, in accordance with another embodiment.

In addition, as shown in FIG. 9, metal reinforcement 92 or other support elements may be injected within the protrusion 70 and the end panel 76 when 3D printing the second structural member 42. The metal reinforcement 92 may further strengthen the protrusion 70, and thereby, the connection between the first and second structural members 40, 42. For instance, the metal reinforcement 92 may comprise rebar. In the example of FIG. 9, the metal reinforcement 92 may comprise two rebar shafts in an X-formation within a single layer of the second structural member 42. However, other configurations for the metal reinforcement 92 may be used.

The metal reinforcement 92 may be inserted in every layer of the second structural member 42, every layer of the protrusion 70, every third layer of the second structural member 42 or the protrusion 70, every fourth layer of the second structural member 42 or the protrusion 70, or in any other sequence. To facilitate insertion of the metal reinforcement 92, the print head 24 may include a mechanism that injects the rebar into the protrusion 70 and the end panel 76 after a layer of the same is deposited. For instance, a nail gun or other similar mechanism may be coupled to the print head 24.

Figure 10:
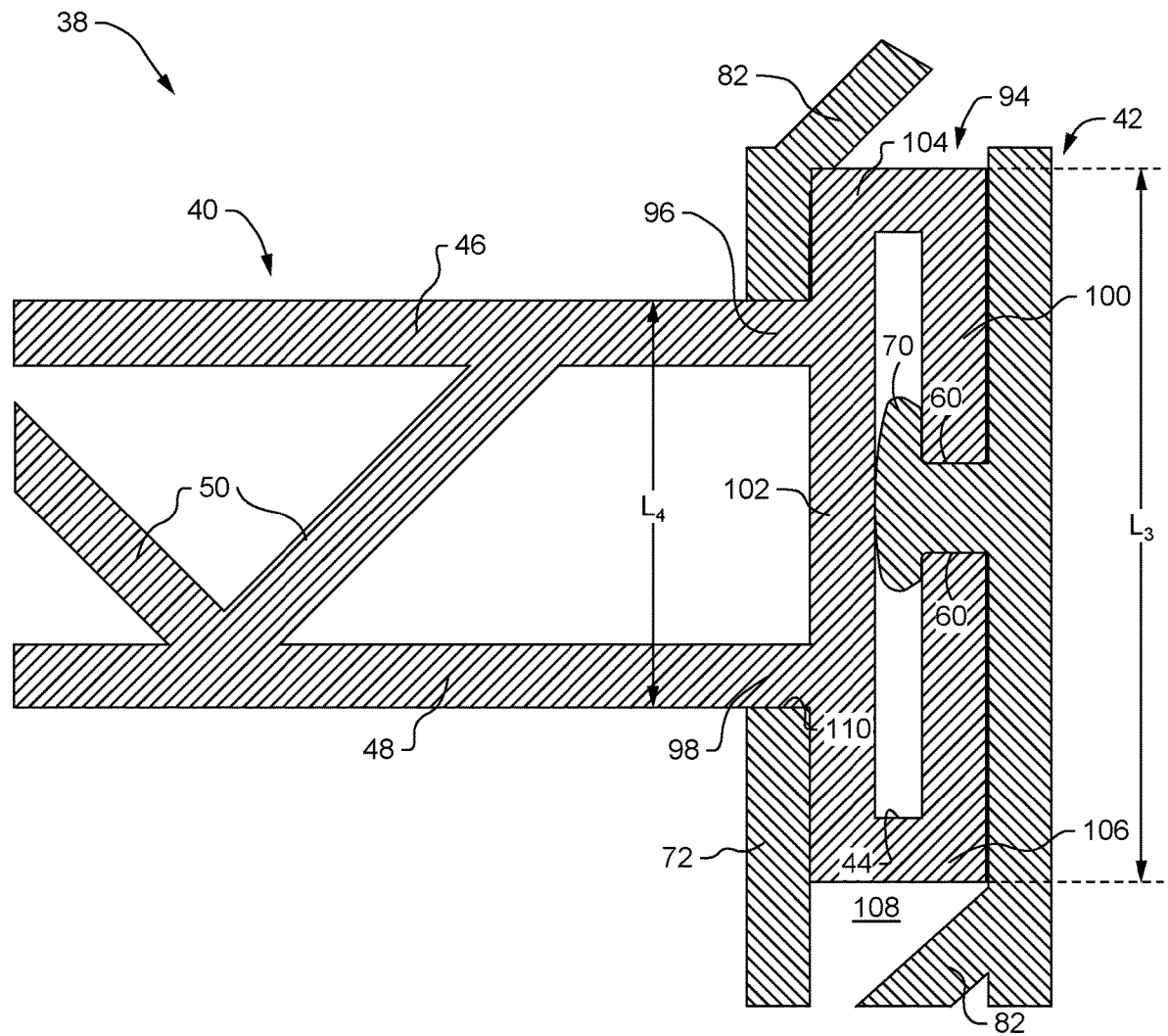
FIG. 10 is an enlarged cross-sectional view of a connection between the first structural member and the second structural member of FIG. 4, in accordance with another embodiment.

Turning now to FIG. 10, with continued reference to FIGS. 1-9, another interlocking connection between the first and second structural members 40, 42 is shown, in accordance with another embodiment. In this example, the first structural member 40 may include an engagement section 94, and the second structural member 42 may encompass the engagement section 94 of the first structural member 40. More specifically, the first structural member 40 the engagement section 94 may be disposed at ends 96, 98 of the first panel 46 and the second panel 48, respectively.

The engagement section 94 may contain the cavity 44 and may be configured to be disposed within and interlock with the second structural member 40. For instance, the engagement section 94 may include an outer panel 100, an inner panel 102 opposite the outer panel 100, and side panels 104, 106 connecting the outer and inner panels 100, 102. The outer and inner panels 100, 102 may be orthogonal to the first and second panels 46, 48. The outer panel 100, the inner panel 102, and the side panels 104, 106 may define the cavity 44.

In addition, a cross-section of the cavity 44 as defined by the panels 100, 102, 104, 106 may be generally rectangular in shape, although other shapes for the cavity 44 may be used. Furthermore, a length $L_3$ of the outer and inner panels 100, 102 may be greater than a length $L_4$ from the first panel 46 to the second panel 48. In so doing, the engagement section 94 may form a T-shape with a rest of the first structural member 40, although other shapes may be used. Moreover, the opening 60 for the protrusion 70 may be disposed on the outer panel 100 and may lead to a center of the cavity 44. However, other configurations for the first structural member 40, the cavity 44, the opening 60, and the engagement section 94 may be used.

The second structural member 42 may be formed around the engagement section 94 of the first structural member 40, thereby encompassing and interlocking the engagement section 94. More specifically, the engagement section 94 may be disposed inside the second structural member 42, such as within an interior 108 of the second structural member 42 defined by the first panel 72, the second panel 74, and the infill 82. The second panel 74 of the second structural member 42 may be adjacent to the outer panel 100 of the first structural member 40, while the first panel 72 of the second structural member 42 may be adjacent to the inner panel 102 and the ends 96, 98 of the first and second panels 46, 48 of the first structural member 40.

The first panel 72 may have an opening 110 approximately the length $L_4$ from the first panel 46 to the second panel 48. With the first panel 72 of the second structural member 42 encompassing the ends 96, 98 of the first and second panels 46, 48, and the length $L_3$ of the inner panel 102 being greater than the length $L_4$ of the opening, the engagement section 94 may be unable to pass through the opening 110 in the first panel 72 of the second structural member 42. In so doing, the engagement section 94 may be interlocked inside the second structural member 42, thereby connecting the first and second structural members 40, 42.

Furthermore, the protrusion 70 of the second structural member 42 may be disposed within the opening 60 and the cavity 44 in the engagement section 94 of the first structural member 40. In this example, the protrusion 70 may extend inwardly from the second panel 74 of the second structural member 42 into the cavity 44 of the engagement section 94. In so doing, the protrusion 70 may interlock with the cavity 44 of the engagement section 94, thereby providing a second connection between the first and second structural members 40, 42. However, other configurations for multiple interlocking connections between the first and second structural members 40, 42 may be used.

Figure 11:
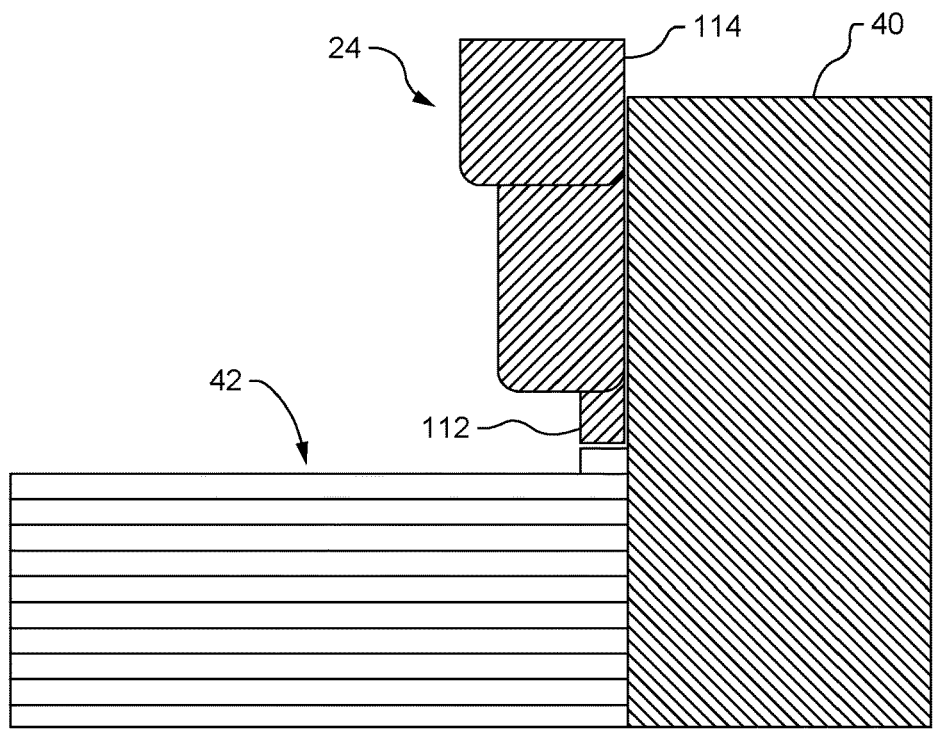
FIG. 11 is a side view of a print head with an offset nozzle forming the 3D printed structure of FIG. 4, in accordance with another embodiment.
Figure 12:
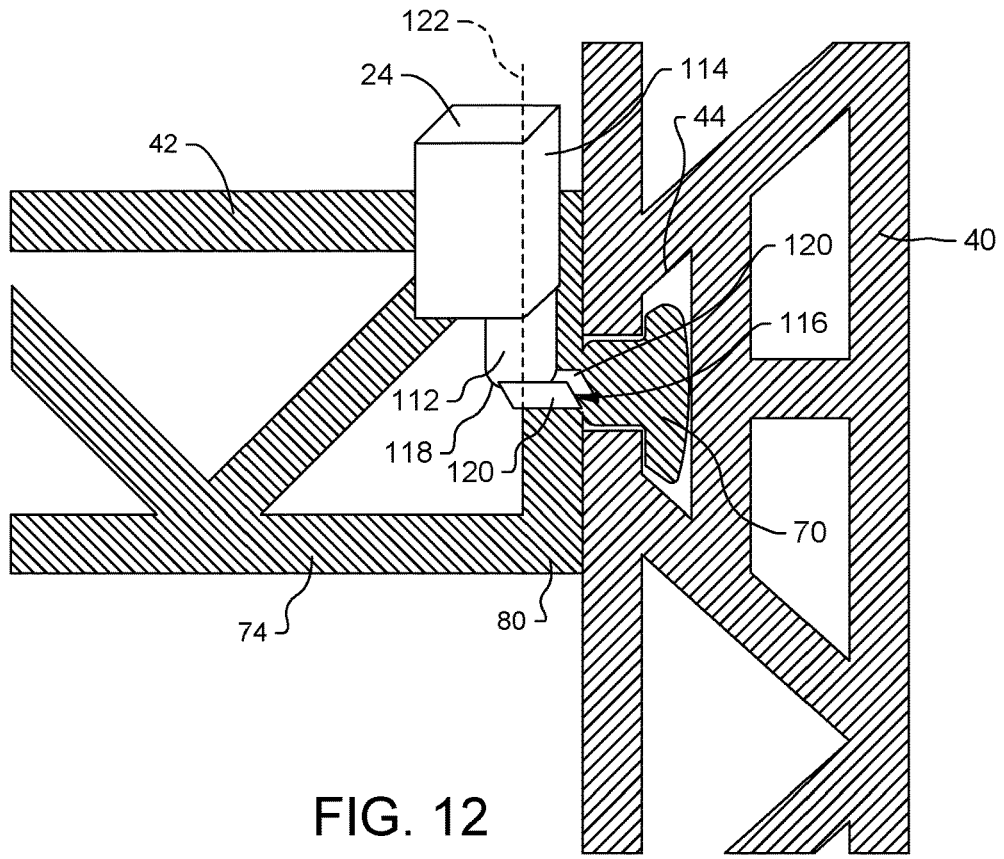
FIG. 12 is a top view of the print head of FIG. 11 with the offset nozzle and an articulable chute forming the 3D printed structure, in accordance with another embodiment.

Referring now to FIGS. 11 and 12, with continued reference to FIGS. 1-10, the print head 24 may include a nozzle 112 positioned at a side 114 of the print head 24, such as fully offset to one side 114 of the print head 24. The nozzle 112 may be configured to control flow of the material out of the print head 24. Compared to prior art print heads which included centrally-located nozzles, the nozzle 112 may be positioned off-center of the print head 24 adjacent to the side 114 or edge of the print head 24. In so doing, the system 20 may enable 3D printing of the second structural member 42 directly adjacent to and interlocking with the first structural member 40.

More specifically, when 3D printing the second structural member 42, the print head 24 and the nozzle 112 may be positioned directly adjacent to the already formed first structural member 40. Accordingly, the nozzle 112 may extrude the material for the second structural member 42 such that it may be accurately deposited adjacent to the first structural member 40 in order to connect the first and second structural members 40, 42. In addition, the offset nozzle 112 may help facilitate 3D printing of the protrusion 70 inside the cavity 44.

Furthermore, the print head 24 may include an articulable chute 116 (FIG. 12) operatively coupled to and proximate an end 118 of the nozzle 112. The articulable chute 116 may be configured to angle a discharge of the material from the nozzle 112. By angling the discharge of the material from the nozzle 112, the articulable chute 116 may facilitate extrusion of the material into interior cavities of existing structures, such as to form the protrusion 70 within the cavity 44 of the first structural member 40.

In one example, the articulable chute 116 may comprise a plurality of sheets 120 hinged to the end 118 of the nozzle 112. The plurality of sheets 120 may be composed of metal or any other type of material. For instance, the plurality of sheets 120 may have a generally rectangular shaped cross-section, although other configurations may be used. The plurality of sheets 120 may be in contact with a control rod, which is connected to and moved by actuators.

The controller 62 of the system 20 may be in operative communication with the articulable chute 116, such as with the actuators that move the control rod. For instance, the controller 62 may send signals to the actuators in order to move the control rod which, in turn, moves the plurality of sheets 120, such as to a specific angle relative to and/or about a vertical axis 122 of the nozzle 112 of the print head 24. In so doing, the controller 62 may be configured to adjust the articulable chute 116 to control the angle of discharge of the material from the nozzle 112.

Figure 13:
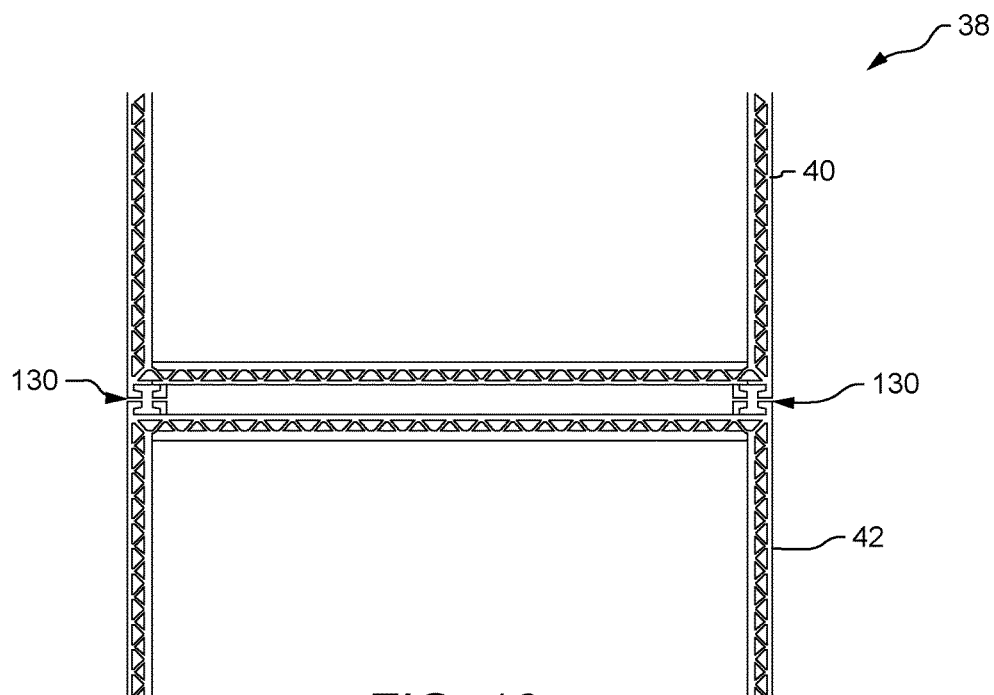
FIG. 13 is a cross-sectional view of a 3D printed structure formed from connecting a first structural member and a second structural member together, in accordance with another embodiment.
Figure 14:
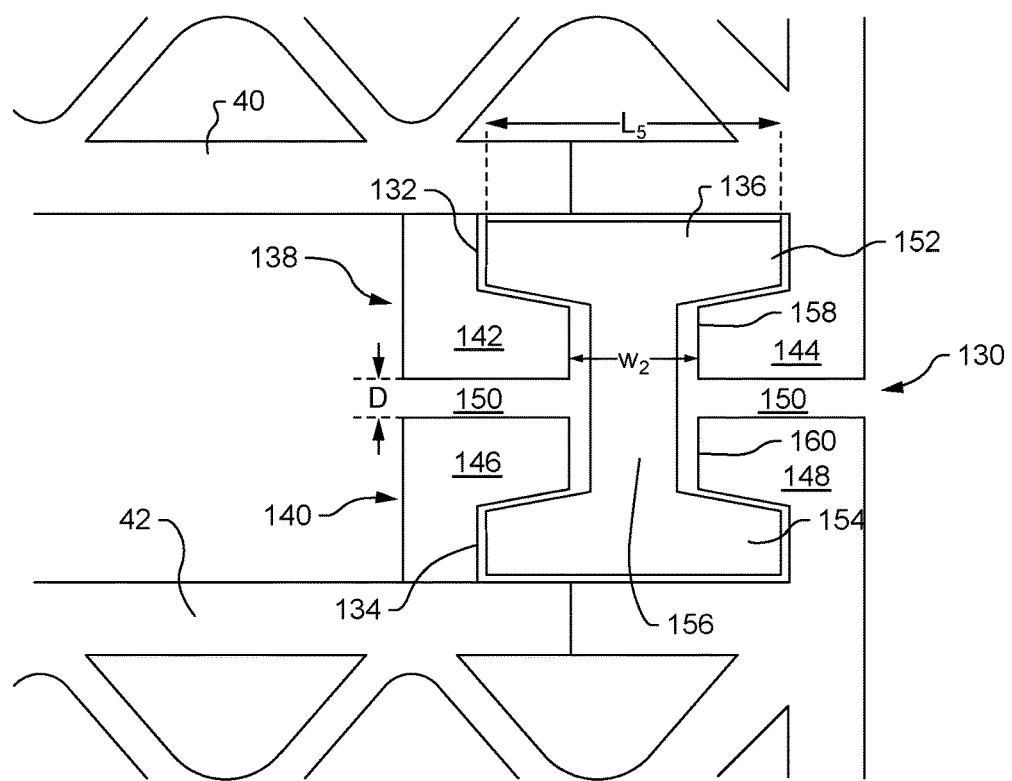
FIG. 14 is an enlarged cross-sectional view of a flex joint of FIG. 13, in accordance with another embodiment.

Turning now to FIG. 13, with continued reference to FIGS. 1-12, the system 20 may be configured to produce the connected 3D printed structure 38 with at least one flex joint 130. For example, the system 20 may be configured to connect two 3D printed structural members 40, 42 together using flex joints 130. As shown in FIG. 14, each of the first structural member 40 and the second structural member 42 may include a cavity 132, 134, respectively, for receiving a spline 136. The spline may be configured to interlock with the cavities 132, 134 in the first and second structural members 40, 42.

More specifically, the first structural member 40 may include a first receiving section 138 with a first cavity 132 therein, and the second structural member 42 may include a second receiving section 140 with a second cavity 134 therein. The first cavity 132 may be formed and defined by components 142, 144 in the first receiving section 138 having a substantially L-shaped cross-section. Similarly, the second cavity 134 may be formed and defined by components 146, 148 in the second receiving section 140 having a substantially L-shaped cross-section.

Each of the first cavity 132 and the second cavity 134 may have a substantially T-shaped cross-section. The second receiving section 140 may be positioned relative to the first receiving section 138 such that the second cavity 134 mirrors the first cavity 132. In addition, the second receiving section 140 may be disposed at a distance D from the first receiving section 138, thereby forming gaps 150. However, other shapes and configurations for the first cavity 132, the second cavity 134, the first receiving section 138, and the second receiving section 140 may be used.

The spline 136 may include a first interlocking portion 152, a second interlocking portion 154, and a bridge portion 156 therebetween. The spline 136 may be composed of metal, such as steel, reinforced concrete, composite, or any other type of material. In an example, the spline 136 may have a substantially I-shaped cross-section. For instance, the spline 136 may comprise an I-beam. However, other shapes and configurations for the spline 136 may be used.

After formation of the first and second structural members 40, 42, the spline 136 may be lowered vertically or otherwise inserted within both of the first and second cavities 132, 134. A length of the first and second interlocking portions 152, 154 may be greater than a width $W_2$ of openings 158, 160 in the first and second receiving sections 138, 140, respectively. In so doing, the spline 136 may interlock with the first and second cavities 132, 134, thereby connecting the first and second structural members 40, 42. By connecting the first and second structural members 40, 42 via the spline 136, the members 40, 42 may slide vertically relative to each other but not horizontally.

Figure 15:
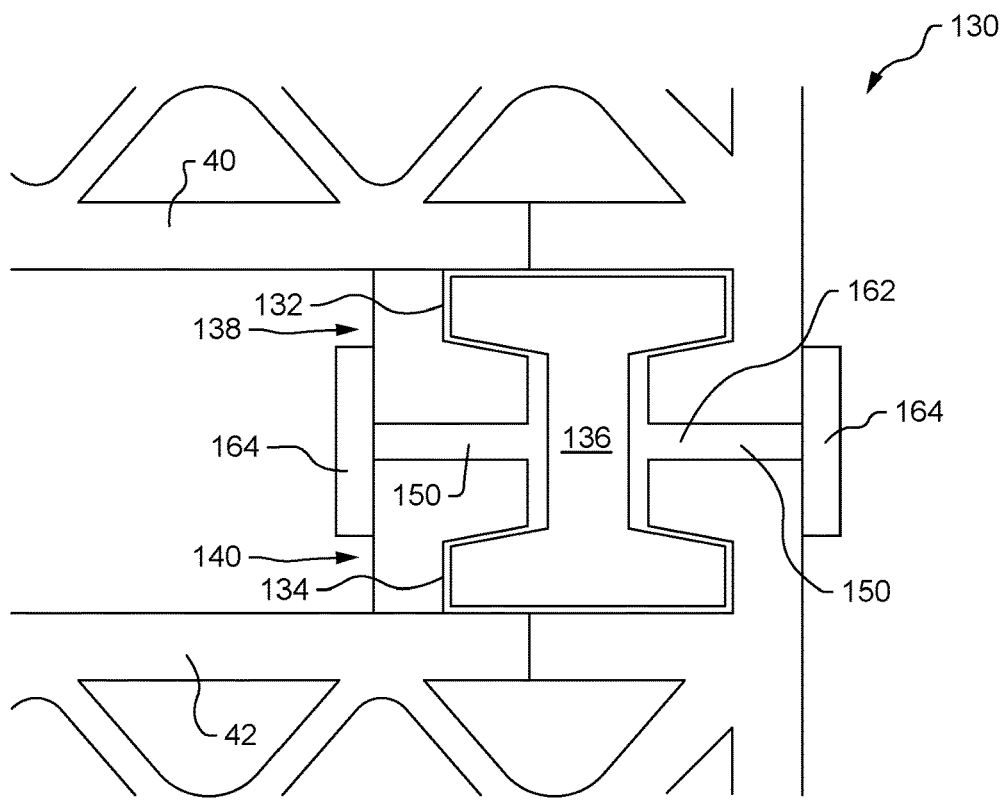
FIG. 15 is an enlarged cross-sectional view of a flex joint of FIG. 13, in accordance with another embodiment.

As shown in FIG. 15, a shock-absorbing layer 162 may surround the spline 136. The shock-absorbing layer 162 may be configured to distribute a load more evenly and efficiently throughout the flex joint 130 between the first and second structural members 40, 42. In addition, the shock-absorbing layer 162 may allow the first and second structural members 40, 42 to move relative to each other.

The shock-absorbing layer 162 may be composed of a shock-absorbing material, such as a caulk, a foam, a lighter grade concrete, and the like. In one example, the shock-absorbing layer 162 may be injected into the flex joint 130 after the spline 136 has been inserted within the cavities 132, 134 of the receiving sections 138, 140. However, other ways for including the shock-absorbing layer 162 may be used.

For instance, barriers 164 may be placed on exterior surfaces of the first and second receiving sections 138, 140 adjacent to the gaps 150. The barriers 164 may be configured to contain the shock-absorbing layer 162 during solidification. More specifically, the shock-absorbing layer 162 may fill interior spaces, such as the gaps 150 and the cavities 132, 134, between the spline, the first receiving section 138, and the second receiving section 140. After solidification of the shock-absorbing layer 162, the barriers 164 may be removed. However, the barriers 164 may be permanently attached to the flex joint 130 as well.

Figure 16:
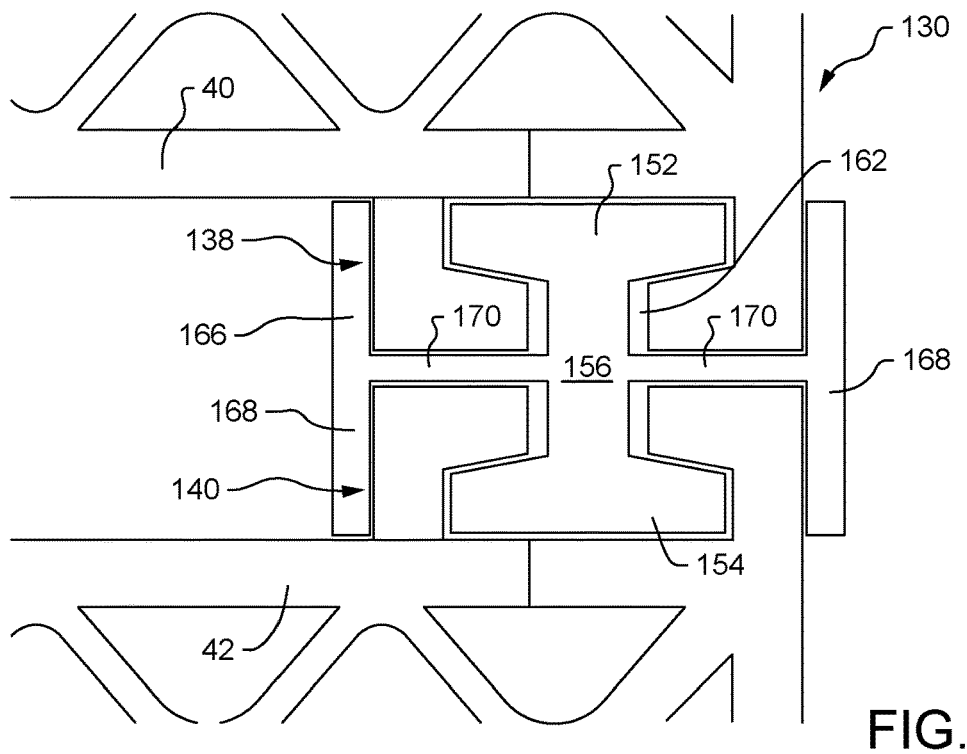
FIG. 16 is an enlarged cross-sectional view of a flex joint of FIG. 13, in accordance with another embodiment.

In another example, shown in FIG. 16, the flex joint 130 may include a spline 166 with integrated barriers. For instance, the spline 166 may include barrier segments 168 disposed on exterior surfaces of the first and second receiving sections 138, 140, as well as support segments 170 disposed within the gaps 150. The barrier segments 168 may be configured to contain the shock-absorbing layer 162 during solidification, while the support segments 170 may connect the barrier segments 168 to the bridge portion 156 of the spline 166.

Figure 17:
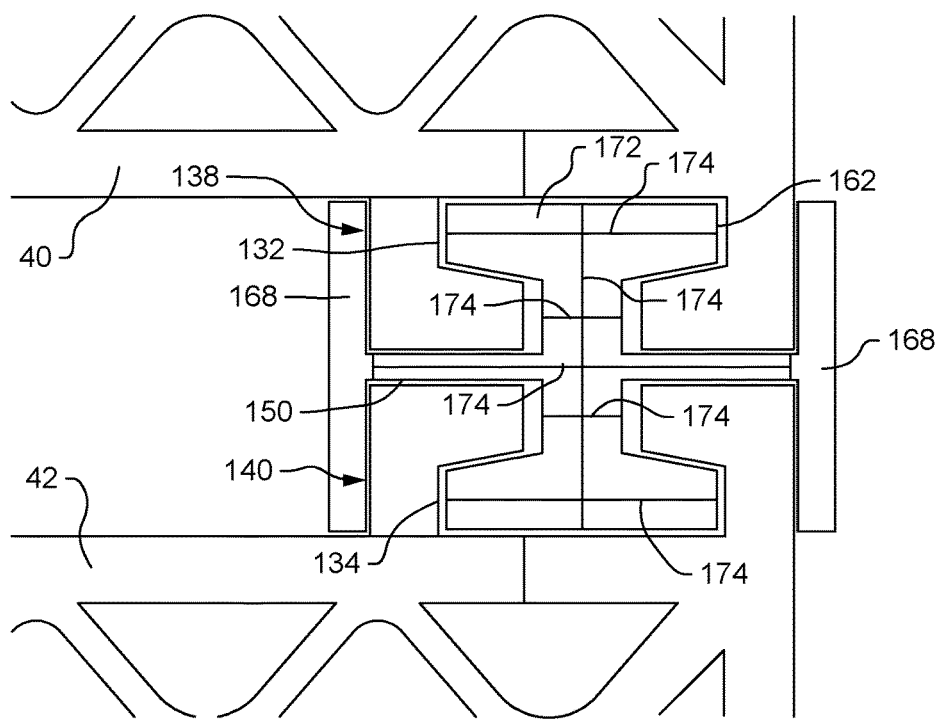
FIG. 17 is an enlarged cross-sectional view of a flex joint of FIG. 13, in accordance with another embodiment.

Furthermore, as shown in FIG. 17, the flex joint 130 may include a spline 172 with passages 174 therein. The passages 174 may be configured to facilitate injection of the shock-absorbing layer 162. The passages 174 may be disposed inside the spline 172 and may extend across the spline 172 from one side to another.

More specifically, the passages 174 may allow the shock-absorbing material to pass through the spline 172 and fill interior spaces of the flex joint 130, such as the gaps 150 and the cavities 132, 134. For example, the shock-absorbing material may be pumped under pressure into the passages 174 of the spline 172 until all the interior spaces are filled. In so doing, air pockets in the shock absorbing layer 162 may be reduced.

Figure 18:
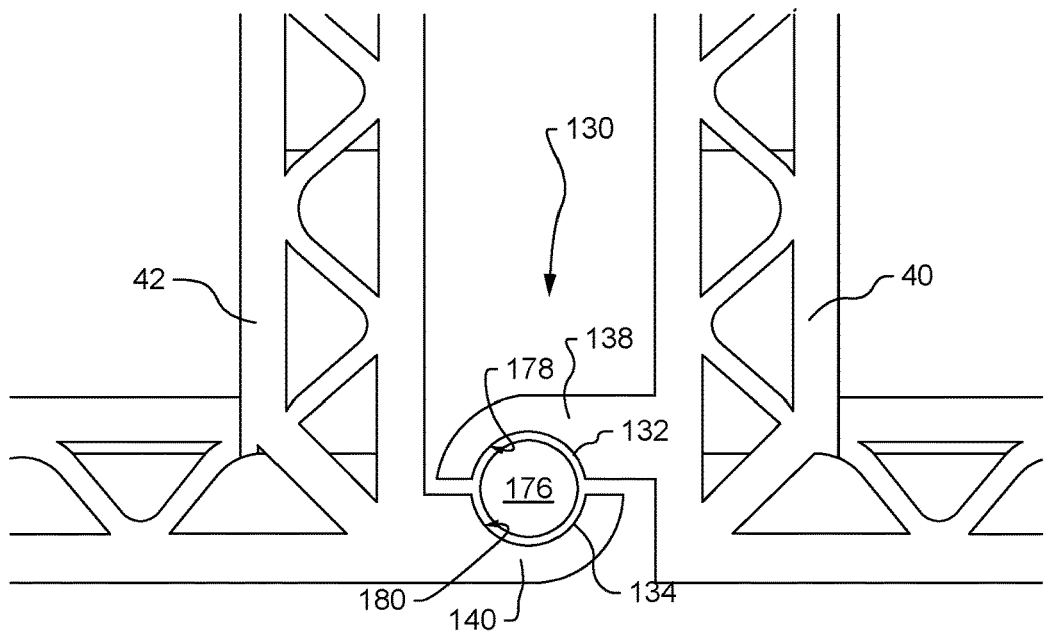
FIG. 18 is an enlarged cross-sectional view of a flex joint of FIG. 13, in accordance with another embodiment.

Turning now to FIG. 18, with continued reference to FIGS. 1-17, the flex joint 130 may include a spline 176 having a circular cross-section. Each of the first cavity 132 and the second cavity 134 may have a substantially semi-circular cross-section to receive at least part of the spline 176. For example, the first receiving section 138 may include a semi-circular surface 178 to receive about one half of the spline 176, and the second receiving section 140 may include a semi-circular surface 180 to receive about the other half of the spline 176.

With rounded surfaces in the spline 176 and the receiving sections 138, 140, the flex joint 130 may have a smoother connection throughout the joint 130. In so doing, the rounded surfaces may ease the loads throughout the joint 130 by removing sharp edges and allowing for angular flex as well. However, other shapes and configurations for the spline 176, the cavities 132, 134, and the receiving sections 138, 140 may be used.

INDUSTRIAL APPLICABILITY

In general, the foregoing disclosure finds utility in various industrial applications, such as in 3D printing construction techniques for structural buildings. The systems and methods disclosed herein may be used to produce connected 3D buildings and other structures. Particularly, the disclosed systems and methods may be used to connect two 3D printed structural members together.

More specifically, the two 3D printed structural members may include design-in features that enable connectivity. For instance, interlocking features, such as cavities, protrusions, and splines, may connect the 3D printed structural members to each other for added stability. In addition, a flex joint may connect the two 3D printed structural members while allowing the members to slide vertically relative to each other but not horizontally. In so doing, the flex joint may allow for flexing between the two members, such as during an earthquake.

A shock absorbing layer may also be included within the connection between the two 3D printed structural members in order to smoothly and evenly distribute the load between the members. An offset nozzle and articulable chute for a print head of a 3D printer is also disclosed. Such features help facilitate accurate extrusion of concrete for formation of the interlocking and other features in the structural members.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A method for forming three-dimensional (3D) printed structures, comprising:
    3D printing a first structural member of a first wall of a building including a first panel, a second panel, an infill portion connecting the first panel and the second panel, and an opening to a cavity inside the first structural member; and
    3D printing a second structural member of a second wall of the building including a protrusion disposed within the opening and the cavity of the first structural member.

2. The method of claim 1, further comprising 3D printing the protrusion of the second structural member to interlock with the cavity of the first structural member in order to connect the second structural member to the first structural member.

3. The method of claim 1, further comprising injecting metal reinforcement within the protrusion when 3D printing the second structural member.

4. The method of claim 1, further comprising extruding a cement-based material through an offset nozzle and an articulable chute when 3D printing the second structural member including the protrusion.

5. The method of claim 1, further comprising 3D printing the protrusion with an interlocking portion including a dimension greater than a width of the opening in the first structural member.

6. The method of claim 5, further comprising 3D printing the protrusion having a substantially T-shaped cross-section.

7. The method of claim 5, further comprising:
    3D printing an engagement section of the first structural member containing the cavity and configured to be disposed within and interlock with the second structural member; and
    3D printing the second structural member to encompass the engagement section of the first structural member.

8. The method of claim 5, further comprising 3D printing curved surfaces for the cavity in the first structural member.

9. The method of claim 8, further comprising 3D printing the interlocking portion having a circular cross-section.

10. The method of claim 1, wherein the infill portion extends at an angle with respect to the first panel and the second panel.

11. The method of claim 1, wherein the first structural member and the second structural member include a cement-based material.

12. The method of claim 1, further including:
    3D printing a plurality of layers to form the first structural member with a plurality of cavities to form the first wall; and
    3D printing a plurality of layers to form the second structural member with a plurality of protrusions disposed within the openings to form the second wall.

13. The method of claim 12, wherein a number of layers of the second wall is larger than a number of protrusions disposed within the openings of the first wall.

14. The method of claim 1, wherein a longitudinal axis of the first structural member extends orthogonally with respect to a longitudinal axis of the second structural member.

15. A method for forming three-dimensional (3D) printed structures, comprising:
    3D printing a first wall of a habitable building including a first structural member with a first panel, a second panel, an infill portion connecting the first panel and the second panel, and an opening to a cavity inside the first structural member; and
    3D printing a second wall of the habitable building including a second structural member with a protrusion disposed within the opening and the cavity of the first structural member, wherein the first structural member and the second structural member include a cement-based material.

16. The method of claim 10, wherein the cement-based material includes concrete.

17. The method of claim 15, wherein the protrusion is 3D printed at a position that interlocks the first structural member and the second structural member.

18. The method of claim 15, wherein infill portion extends at an angle with respect to the first panel and the second panel.

19. The method of claim 15, further including extruding the cement-based material through an offset nozzle and an articulable chute when 3D printing the second structural member including the protrusion.

20. A method for forming three-dimensional (3D) printed structures, comprising:
- 3D printing a first wall of a habitable building including a first structural member with a first panel, a second panel, an infill portion connecting the first panel and the second panel, and an opening to a cavity inside the first structural member; and
- 3D printing a second wall of the habitable building including a second structural member with a protrusion disposed within the opening and the cavity of the first structural member, the protrusion being 3D printed at a position that interlocks the first structural member and the second structural member, wherein the first structural member and the second structural member include a cement-based material.

* * * * *